(12) United States Patent
Morehead

(10) Patent No.: US 7,140,327 B2
(45) Date of Patent: Nov. 28, 2006

(54) ILLUMINATED COLLAR

(76) Inventor: Sondra Morehead, 7919 Fenley Dr., Amarillo, TX (US) 79121

( * ) Notice: Subject to any disclaimer, the term of this patent is extended or adjusted under 35 U.S.C. 154(b) by 0 days.

(21) Appl. No.: 10/815,601

(22) Filed: Apr. 1, 2004

(65) Prior Publication Data

US 2005/0217611 A1    Oct. 6, 2005

(51) Int. Cl.
*A01K 29/00* (2006.01)
(52) U.S. Cl. .................. 119/859; 119/856
(58) Field of Classification Search .......... 119/856, 119/859, 858; 362/570, 571; D26/27, 39; D30/152
See application file for complete search history.

(56) References Cited

U.S. PATENT DOCUMENTS

| | | |
|---|---|---|
| 1,623,002 A | 7/1926 | Gossett |
| 2,721,257 A | 10/1955 | Knox |
| 4,173,201 A | 11/1979 | Chao et al. |
| 4,186,425 A | 1/1980 | Nadimi |
| 4,875,145 A | 10/1989 | Roberts |
| 4,887,552 A | 12/1989 | Hayden |
| 4,895,110 A | 1/1990 | LoCascio |
| 4,909,189 A | 3/1990 | Minotti |
| 5,046,456 A | 9/1991 | Heyman et al. |
| 5,074,251 A | 12/1991 | Pennock |
| 5,140,946 A | 8/1992 | Pennock et al. |
| 5,154,506 A | 10/1992 | Leard |
| 5,355,285 A | 10/1994 | Hicks |
| 5,370,082 A | 12/1994 | Wade |
| 5,430,621 A | 7/1995 | Raskas |
| 5,535,106 A | 7/1996 | Tangen |
| 5,630,382 A * | 5/1997 | Barbera et al. ............ 119/859 |
| 5,649,755 A | 7/1997 | Rapisarda |
| 5,952,925 A | 9/1999 | Secker |
| 6,055,942 A | 5/2000 | Romanak et al. |
| 6,085,698 A | 7/2000 | Klein |
| 6,106,130 A * | 8/2000 | Harding ...................... 362/108 |
| 6,202,599 B1 | 3/2001 | Cutler |
| 6,283,065 B1 | 9/2001 | Shorrock et al. |
| 6,394,040 B1 | 5/2002 | Axel |
| 6,441,778 B1 | 8/2002 | Durst et al. |
| 6,557,498 B1 | 5/2003 | Smierciak et al. |
| D503,997 S | 4/2005 | Sanchez, Jr. |
| 6,970,090 B1 * | 11/2005 | Sciarra ...................... 119/859 |
| 2004/0252524 A | 7/1997 | Dacheux, Jr. |
| 2002/0122316 A1 | 9/2002 | Hsieh |
| 2003/0094145 A1 * | 5/2003 | Cheng ....................... 119/859 |
| 2003/0235048 A1 | 12/2003 | Gyori |

* cited by examiner

*Primary Examiner*—Teri Pham Luu
*Assistant Examiner*—Elizabeth Shaw
(74) *Attorney, Agent, or Firm*—Jack D. Stone, Jr.

(57) ABSTRACT

A collar to which is mounted an illumination source and one or more insets. Each of one or more light-transferring fibers includes a first end coupled for receiving light from the illumination source, and a second end coupled for transmitting light to an inset.

18 Claims, 3 Drawing Sheets

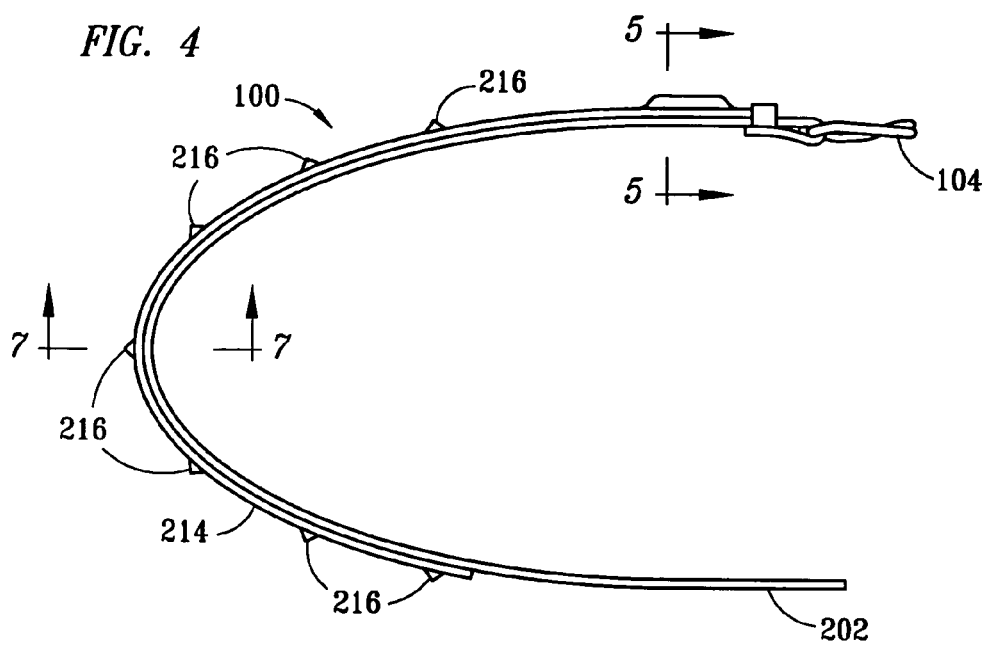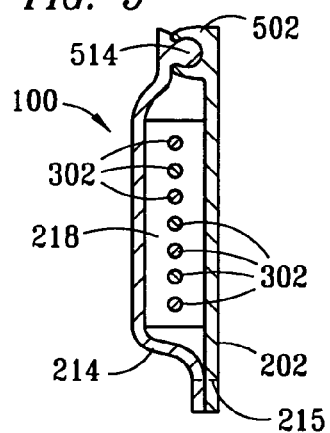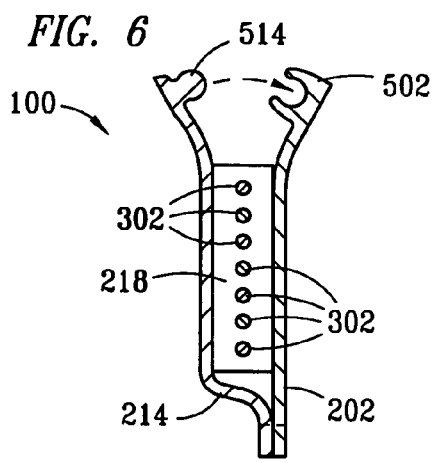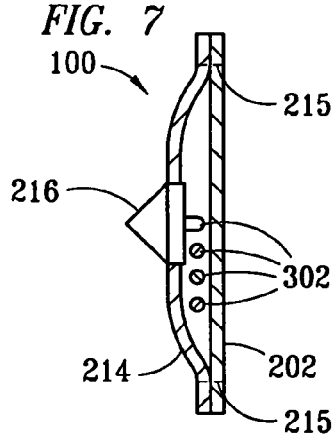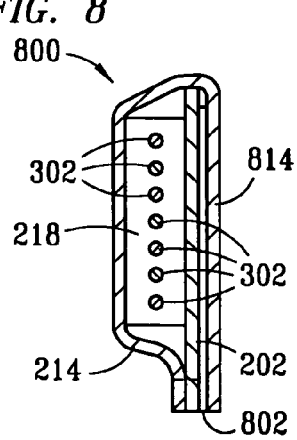

ILLUMINATED COLLAR

TECHNICAL FIELD

The invention relates generally to collars and, more particularly, to safety collars for pets. Still more particularly, the invention relates to an apparatus and an associated method for illuminating a safety collar for use on pets.

BACKGROUND

It is often difficult to see domestic or household animals, referred to herein as "pets," at night or in a dimly lit or unlit area. For that reason, pets frequently pose a safety hazard, not only to themselves, but also to people who occupy the same space. For example, people may trip over pets during the night or in a dark room, resulting in potential harm to the person or to the pet, particularly if the person or pet is elderly or recovering from a medical procedure. An elderly person, furthermore, may not be as agile as a younger person, and may be sensitive to an unexpected impact with a pet, and could potentially suffer from an inadvertent or adverse contact with a pet. Likewise, any person with reduced night vision is at a potentially serious health and safety risk from tripping over a pet.

One solution to the foregoing hazards is to provide additional ambient light in unlit or dimly lit areas. However, people have varying sensitivities to light at night, and it is frequently desirable or necessary to maintain minimal, or no, ambient light at night.

Another solution that has been attempted has been to provide pet collars with light-reflecting strips or elements. However, there is often insufficient light to reflect off of such reflective strips or elements, thereby rendering such strips or elements of little or no effect.

To overcome the problem of a lack of light to reflect off of reflective elements of a collar, some collars have been equipped with fluorescent elements which glow temporarily after being exposed to an external light. However, the radiant glow fades quickly and generally does not last through the night, losing virtually all effect, rendering such solution unreliable.

A band of light may be provided on a collar, but that poses a problem to a pet because light may shine such that the animal's eyes are adversely affected, thus impeding that animal's sensory abilities. Additionally, the lights may constitute a distraction and a source of annoyance and discomfort to the pet and people.

Collars may be provided with noise-generating collar elements, such as a bell or chain. The noise generated from such collars may disturb both the animal and person as the pet moves about the house. Additionally, many people may not find noise or sound an adequate indicator of the animal's precise location or direction of motion.

It is apparent that conventional techniques do not satisfactorily address the aforementioned hazards and shortcomings with attempted solutions to the hazards. Therefore, what is needed is a pet safety collar which does not constitute a burden, and is thereby comfortable, to a pet wearing the collar, while providing at the same time a clear, visible warning effective for enabling a person to identify a specific location of a pet, and to thereby assist in avoiding unwanted contact with such a pet in an unlighted environment.

SUMMARY

The present invention, accordingly, provides a collar to which is mounted an illumination source and one or more insets. Each of one or more light-transferring fibers includes a first end coupled for receiving light from the illumination source, and a second end coupled for transmitting light to an inset.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a plan view of the collar of FIG. 1;

FIG. 5 is cross-sectional view of the collar of FIG. 1 taken along the line 5—5 of FIG. 4;

FIG. 6 is an alternate view of the collar of FIG. 5 depicted in an open state;

FIG. 7 is cross-sectional view of the collar of FIG. 1 taken along the line 7—7 of FIG. 4;

FIG. 8 is a cross-sectional view of an alternate embodiment of the collar of FIG. 1 taken along the line 5—5 of FIG. 4;

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning fiber optics and the like have been omitted inasmuch as such details are not considered necessary to obtain a complete understanding of the present invention, and are considered to be within the skills of persons of ordinary skill in the relevant art.

Figure 1:
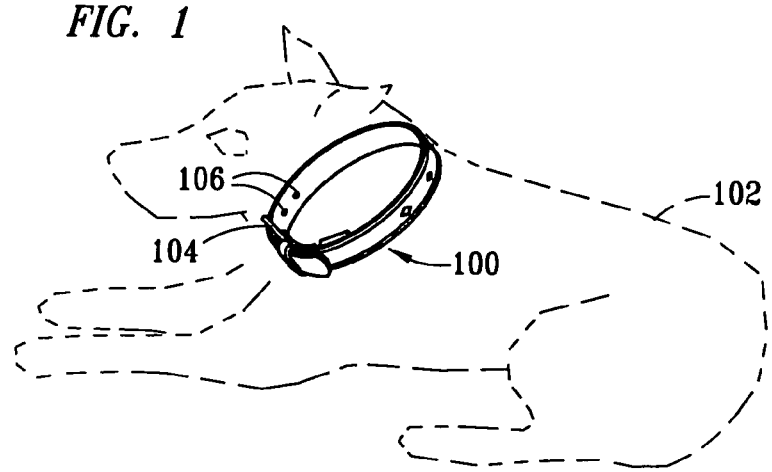
FIG. 1 is a perspective view of a safety collar embodying features of the present invention and positioned on a pet depicted in outline form.

Referring to FIG. 1 of the drawings, the reference numeral 100 generally designates a safety collar embodying features of the present invention. The collar 100 is shown fitted around the neck of a pet 102, such as a dog, cat, or the like, shown in outline form. The collar is secured about the neck by a conventional clasp 104 configured for matingly engaging holes 106 defined in the collar.

Figure 2:
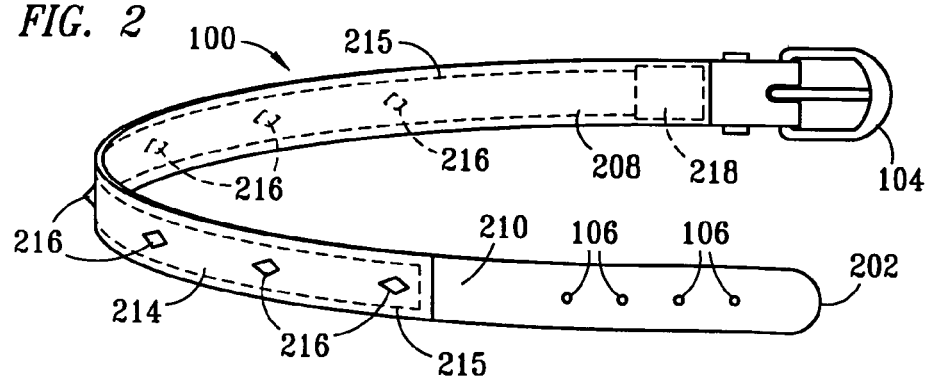
FIG. 2 is a perspective view of the safety collar of FIG. 1 shown unclasped and removed from the pet.

FIG. 2 shows the collar 100 apart from the pet 102, and the clasp 104 disengaged from the holes 106. As shown therein, the collar 100 comprises a generally annular collar base 202. The annular collar base 202 may be fabricated from any of a number of suitable materials, such as nylon, leather, cloth, metal, or the like, and any combination thereof, effective for remaining secured about the neck of the pet 102 and withstanding rough daily wear by a pet. The annular collar base 202 further comprises an interior surface 208 which would be positioned against the skin or fur of the pet 102 when fitted thereon, and an exterior surface 210 opposite the interior surface 208, which exterior surface is exposed and most easily visible to an observer when the collar is fitted on a pet.

A band 214 is positioned on the exterior surface 210 of the collar 100, and is preferably secured thereto via conventional stitching 215. A number of light-emitting elements, referred to herein as insets, 216 (seven of which are depicted) are mounted on the band 214. The insets 216 may comprise any of a number of different materials, such as glass, plastic, hard plastic simulating precious stones (e.g., cubic zirconium), or the like, effective for permitting light to pass therethrough, and preferably resistant to heat and scratches. The insets 216, furthermore, may be configured in any desirable shape, such as a diamond shape (as exemplified in FIG. 2), a round shape, or an oval shape, and may be colored as desired. An illumination source 218, described in further detail below, is preferably mounted on the exterior surface 210 of the collar 100, and is secured therein by the band 214, as described in further detail below. Alternatively, the illumination source 218 may be mounted on the exterior surface 210 without cover of the band 214 to provide ready access to a person, or may be mounted on the interior surface 208 of the collar 100.

In a preferred embodiment, the insets 216 are positioned on the band 214 so as to be directed away from the pet's face and eyes. It is therefore contemplated that the insets 216 are positioned on the generally annular collar base 202 away from the head of the pet and toward its torso. Many household pets are sensitive to light, as are many people; thus, having a constantly glowing element on the animal's neck may constitute a nuisance to the pet.

Figure 3:
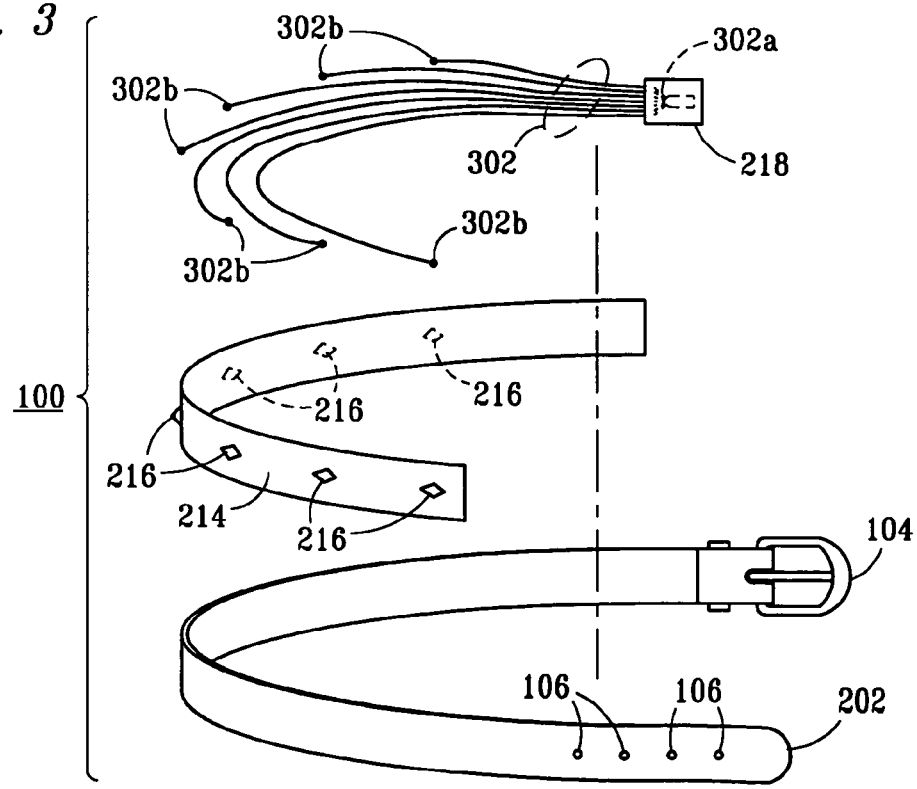
FIG. 3 is an exploded view of the collar of FIG. 1.

As shown in FIG. 3, an exploded view of the collar 100, one or more light-transferring fiber optic strings 302 extend from the illumination source 218. The light-transferring fiber optic strings 302 preferably comprise one or more fiber optic filaments fabricated utilizing conventional fiber optic technology, preferably generate little or no heat, and are preferably sufficiently flexible to permit wrapping with the collar 100 around the neck of a pet. If multiple fiber optic filaments are utilized to constitute each of the fiber optic strings 302, the filaments may be encased in a sheath, fabricated from a material such as nylon. In alternative embodiments of the invention, the fiber optic strings 302 may be fabricated from any material, such as plastic, glass, and the like, effective for transferring light from a light source.

In a preferred embodiment, the number of fiber optic strings 302 corresponds to the number of insets 216, such that one fiber optic string 302 corresponds to a respective inset 216. Each fiber optic string 302 includes a first end 302a and a second end 302b. As described in further detail below with respect to FIGS. 10 and 11, the first end 302a is optically connected to the illumination source 218 for receiving light therefrom. The second end 302b of each fiber optic string 302 is secured to a respective inset 216 so that light received at the first end 302a is transferred through the end 302b and emitted through the insets 216 on the band 214. The length of each fiber optic string 302 between the first and second ends is preferably interposed between the collar base 202 and the band 214, and preferably secured thereto using an adhesive, such as glue or epoxy.

FIG. 4 shows a plan view of the collar 100 for the purpose of depicting selected sections of the collar shown in greater detail in FIGS. 5–7 below.

FIG. 5 shows a cross-section of the collar 100 taken along the line 5—5 of FIG. 4. As shown therein, the band 214 wraps around and encases the illumination source 218, depicted having seven fiber optic strings 302 extending therefrom. As viewed in FIG. 5, a seal 514 is formed along an upper edge of the band 214 for matingly engaging a cooperating seal 502 formed along an upper edge of the collar base 202, to thereby form a preferably water-tight seal in the manner of a Ziploc® seal. FIG. 6 shows the cross-section of FIG. 5, but with the seals 502 and 514 disengaged from each other to form an opening through which the illumination source 218 may be accessed, as described in further detail below.

FIG. 7 shows a cross-section of the collar 100 taken along the line 7—7 of FIG. 4. As viewed therein, the band 214 is secured to the collar base 202 via stitching 215 at both the top and bottom of the band, to thereby envelope fiber optic strings 302 traversing therethrough. It is noted that a selected one of the fiber optic strings 302 is coupled to the inset 216 for transferring light to the inset.

FIG. 8 shows a cross-section of an alternate embodiment of the collar 100, designated by the reference numeral 800, taken along the line 5—5 of FIG. 4. The collar 800 is similar to the collar 100, but for the seal portions 502 and 514, which are functionally replaced by an extended portion, or flap, 814 of the band 214 configured for wrapping around the collar base 202. The band flap 814 and collar base 202 are preferably provided with hook-and-loop material 802 such as Velcro® so that the band flap 814 and collar base 202 may be secured together. It may be appreciated that, with the collar 800 positioned on the neck of a pet, pressure of the collar against the neck of the pet will act to maintain the coupling of the hook-and-loop portions 802 of the Velcro®.

Figure 9:
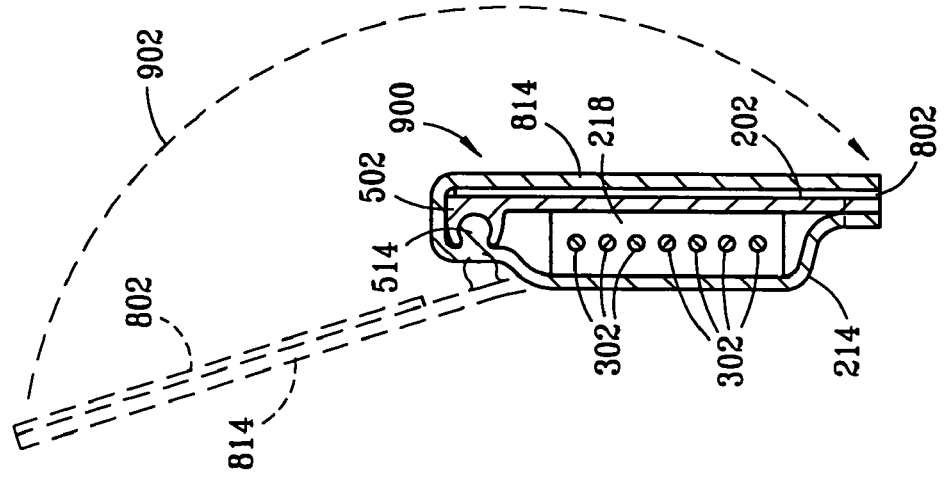
FIG. 9 is a cross-sectional view of a second alternate embodiment of the collar of FIG. 1 taken along the line 5—5 of FIG. 4.

FIG. 9 shows a cross-section of a second alternate embodiment of the collar 100, designated by the reference numeral 900, taken along the line 5—5 of FIG. 4. The collar 900 is similar to the collar 100, but includes the seal portions 502 and 514 (FIG. 5), as well as the band flap 814 (FIG. 8) securable to the collar base 202 via hook-and-loop material 802 such as Velcro®. The schematic arrow 902 depicts closure of the flap 814 to the collar base 202, as discussed in further detail below.

Figure 10:
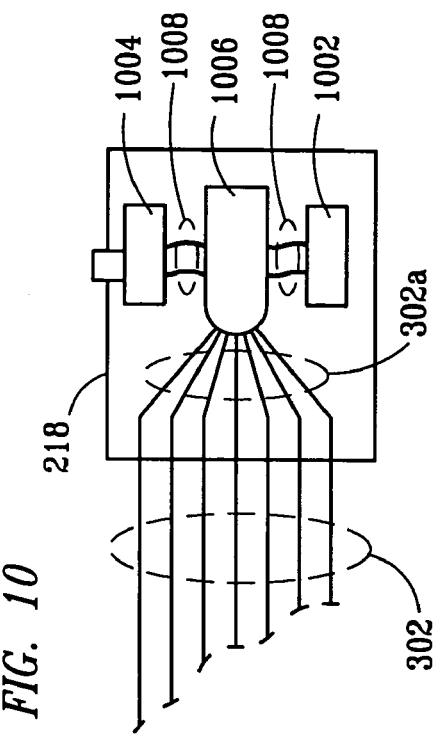
FIG. 10 is a illumination module utilized by the collar of FIG. 1, operable by a manual switch mechanism.

FIG. 10 depicts the illumination source 218 having a light-generating element 1006 operably interconnected via wires 1008 to a power supply 1002, such as a battery, and a control mechanism 1004, such as a conventional mechanical switch, operable by a user for activating the illumination source 218. The light-generating element 1006 preferably comprises one or more light emitting diodes (LED's), but may alternatively comprise a conventional light bulb, or the like, preferably effective for generating a low-intensity light having little or no heat. The light emitted from the light-generating element 1006 is preferably visible to a human eye, but not to the eyes of the animal wearing the collar 100, it being understood that, while different pets may have different ranges of light to which they are not sensitive, some species may not be amenable to such a range. The ends 302a of the one or more fiber optic strings 302 are coupled to the light-generating element 1006 for receiving light therefrom. The power supply 1002 is preferably a replaceable battery, as is commonly employed in small electronic devices such as a watch, hearing aids, cameras, and the like. The power supply 1002 may be re-positioned in the illumination source 218 adjacent the control mechanism 1004 to facilitate access and replacement. It is considered that additional circuitry and circuit elements (e.g., a transformer) necessary to enable functionality of the illumination source 218 described herein would be apparent to a person having ordinary skill in the art upon a reading of the present disclosure and, therefore, will not be described in further detail herein. The illumination source 218 is preferably housed in an enclosure that is configured (e.g., by sealing the entry points of the fiber optic strings 302 with a glue, such as epoxy) for preventing water from entering the enclosure and affecting the components housed therein. The illumination source 218 is furthermore, preferably enveloped in electric and heat insulation effective for protecting a pet from heat and energy that may emanate from the illumination source 218.

Figure 11:
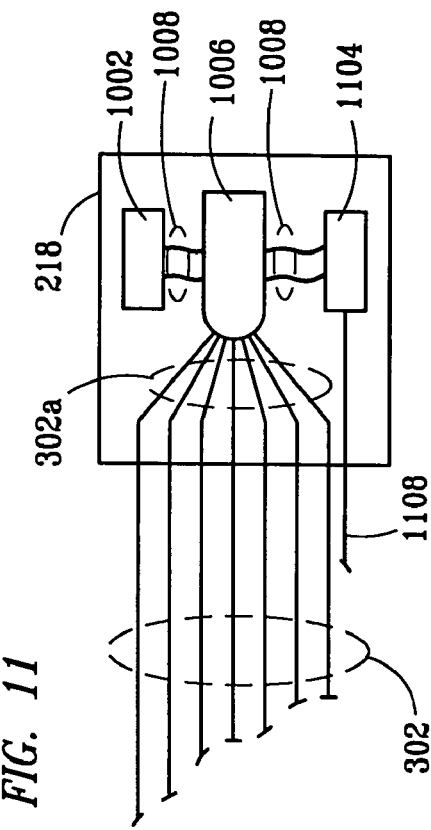
FIG. 11 is an illumination light source module utilized by the collar of FIG. 1, operable by a remote control mechanism.

FIG. 11 depicts an alternate embodiment of the illumination source 218, in which the control mechanism 1004 is replaced by a radio frequency (RF) receiver 1104 coupled to an antenna 1108 effective for receiving from a remote control transmitter (not shown) RF signals transmitted for activating and deactivating the illumination source 218. The antenna 1108 preferably comprises a wire extending from the RF receiver 1104 of the illumination source 218 through the collar 100 between the collar base 202 and the band 214, alongside the fiber optic strings 302. RF remote control technology is considered to be well-known in the art and, therefore, will not be described in further detail herein. It may be appreciated that the embodiment of FIG. 11 permits a person to activate the illumination source 218 remotely without the necessity of capturing the pet prior to activating the illumination source 218. Alternatively, rather than using an RF link between the illumination source 218 and the remote control, such link may be established utilizing infrared light, or other wireless technology.

In operation, the collar 100 is positioned on a pet in a conventional manner. In the embodiment of FIGS. 5 and 10, the illumination source 218 is activated by separating the seal portions 502 and 514, accessing and operating the control mechanism 1004, and then closing the seal portions 502 and 514. In the embodiment of FIGS. 8 and 10, the illumination source 218 is activated by unwrapping the band flap 814, accessing and operating the control mechanism 1004, and then wrapping the band flap 814 back into a closed position. In the embodiment of FIG. 9 and 10, the illumination source 218 is activated by unwrapping the band flap 814 and separating the seal portions 502 and 514, accessing and operating the control mechanism 1004, and then closing the seal portions 502 and 514 and wrapping the band flap 814 back into a closed position, as indicated schematically by the arrow 902. In the embodiment of FIG. 5, 8, or 9, in combination with FIG. 11, the illumination source 218 is activated by a remote control unit. Once the illumination source 218 is activated, then light is emitted from the light-generating element 1006 to the ends 302a of the one or more fiber optic strings 302. The fiber optic strings 302 carry the light from the light-generating element 1006 to the insets 216, and the light is then emitted through and from the insets 216 for alerting persons in poorly lit or unlit areas of the location of the pet wearing the collar 100, thereby preventing accidents, such as tripping over the pet.

The illumination source 218 remains in an activated state until the power supply 1002 is exhausted of power, or until a person deactivates the illumination source 1006 in a manner similar to the aforementioned steps employed to activate the illumination source 218. If the power supply 1002 is exhausted, then it may be replaced by accessing the power supply 1002, in a manner similar to the aforementioned steps employed to activate the illumination source 218, and then replacing the battery in a conventional manner.

By the use of the present invention, an improved collar is provided which does not constitute a burden and is comfortable to a pet wearing the collar, while providing at the same time a clear, visible warning effective for enabling a person to identify the location of a pet, and thereby to assist in avoiding unwanted contact with such a pet in an unlighted environment, which unwanted contact could result in injury to the person and/or the pet.

It is understood that the present invention may take many forms and embodiments. Accordingly, several variations may be made in the foregoing without departing from the spirit or the scope of the invention. For example, the invention may be utilized in connection with specific animal applications or as a component of a medical apparatus, e.g., as a brace, splint, or cast. Certain embodiments may also include automatic activation of the lights by a sensing means on the collar, so that the illumination source 218 is activated when only little ambient light is detected. Other embodiments of the invention may include at least one access point to a harness or leash attached to the collar, to thereby enable lights on the harness or leash to be illuminated along with lights on the collar. In another embodiment, the illumination source 218 may be positioned on the interior surface of the collar base 202, or within an opening cut out of the collar base 202. The illumination source 218 may also be positioned on the exterior surface of the collar base 202 without being enveloped by the band 214. One or more colors of light may be emitted from each inset 216. LED's or light-generating elements may be selected that emit light of colors or frequencies that do not attract, or that even repel, pests, such as insects, fleas, mosquitoes, and the like. In another embodiment of the invention, a transmitter may be configured to activate an alarm to alert a person when a pet has entered a room or crossed a portal, such as when entering or leaving a house.

In a still further embodiment, the illumination source 218 may generate light in an intermittent manner (e.g., repeatedly blinking on and off, wherein the periods of being on and off may or may not be equal) to thereby be more readily perceived and also conserve electrical power. One or more LED's of one or more colors may be positioned within each inset and be electrically connected to a power supply similar to the illumination source 218, but without the light-generating element 1006, and the LED's may generate light continuously or intermittently, and, if intermittently, then the LED's may or may not be synchronized with each other. Multiple light-generating elements 1006 may be connected to one or more insets for displaying light, wherein each light-generating element 1006 may generate light of different color and/or intermittently and, if intermittently, then the light-generating elements 1006 may or may not be synchronized with each other.

The present invention may also be adapted for providing illumination on pet jewelry, clothing, accessories, and the like. Still further, the present invention may be adapted for use on clothing and accessories worn by people. By way of example but not limitation, present invention may also be adapted to enhance safety by providing for illumination on fireman overcoats and hats and on pajamas for young children, to thereby enable firemen and children to be more readily located in dimly lit areas. The present invention may be adapted for aesthetic purposes as well, such as designs on pajamas, watches, and the like.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A collar, comprising:
    at least one illumination source mounted on said collar, wherein said at least one illumination source comprises one or more light generating elements, a power supply connected to said one or more light generating elements for supplying power to said one or more light generating elements, and a control mechanism connected to said power supply and operable for controlling the supply of power provided by said power supply to said one or more light generating elements, said control mechanism comprising at least one of a mechanical switch, a wireless receiver, an RF receiver coupled to an antenna, an infrared light receiver, a sensor for automatically activating the supply of power to said one or more light generating elements when ambient light is less than a predetermined threshold, a switch for intermittently activating and deactivating power to said one or more light generating elements, and one or more switches for intermittently activating and deactivating power to said one or more light generating elements so that selected ones of said one or more light generating elements are activated when non-selected ones of said one or more light generating elements are deactivated;
    one or more insets mounted on said collar; and
    one or more light-transferring fibers each of which fibers includes a first end and a second end, the first end being coupled for receiving light from said one or more light generating elements, and the second end being coupled for transmitting light to an inset.

2. The collar of claim 1, said one or more light generating elements comprises at least one of one or more LED's, and one or more light bulbs.

3. The collar of claim 1, wherein said power supply is a battery.

4. The collar of claim 1, wherein said at least one illumination source is mounted on an exterior surface of said collar.

5. The collar of claim 1, wherein said at least one illumination source is mounted on an interior surface of said collar.

6. The collar of claim 1, wherein said at least one illumination source is mounted in an interior portion of said collar.

7. The collar of claim 1, wherein said one or more insets are mounted on said collar so that, when said collar is mounted on a pet, light from said insets is directed away from the face and eyes of said pet.

8. The collar of claim 1, wherein said one or more light-transferring fibers comprise one or more fiber optic filaments.

9. The collar of claim 1, wherein said one or more light-transferring fibers comprise one or more fiber optic filaments fabricated from at least one of glass and plastic.

10. The collar of claim 1, wherein said one or more insets are adapted for passing one or more predetermined colors of light.

11. The collar of claim 1, wherein said one or more insets are adapted for passing predetermined colors of light that repel at least a portion of pests.

12. The collar of claim 1, further comprising a transmitter adapted to activate an alarm when a pet wearing said collar enters a room.

13. The collar of claim 1, further comprising a transmitter adapted to activate an alarm when a pet wearing said collar crosses a portal.

14. The collar of claim 1, further comprising a leash coupled to said collar, said leash having insets and one or more light-transferring fibers coupled to said at least one illumination source for facilitating the illumination of said insets on said leash.

15. The collar of claim 1, further comprising a harness coupled to said collar, said harness having insets and one or more light-transferring fibers coupled to said at least one illumination source for facilitating the illumination of said insets on said harness.

16. A collar, comprising:
    at least one illumination source mounted on said collar;
    one or more insets mounted on said collar, wherein said one or more insets are adapted for passing predetermined colors of light that repel at least a portion of pests; and
    one or more light-transferring fibers each of which fibers includes a first end and a second end, the first end being coupled for receiving light from said at least one illumination source, and the second end being coupled for transmitting light to an inset.

17. A collar, comprising:
    at least one illumination source mounted on said collar;
    one or more insets mounted on said collar;
    one or more light-transferring fibers each of which fibers includes a first end and a second end, the first end being coupled for receiving light from said at least one illumination source, and the second end being coupled for transmitting light to an inset; and
    a transmitter mounted on said collar adapted to activate an alarm when a pet wearing said collar enters a room.

18. A collar, comprising:
    at least one illumination source mounted on said collar;
    one or more insets mounted on said collar;
    one or more light-transferring fibers each of which fibers includes a first end and a second end, the first end being coupled for receiving light from said at least one illumination source, and the second end being coupled for transmitting light to an inset; and
    a transmitter mounted on said collar adapted to activate an alarm when a pet wearing said collar crosses a portal.

* * * * *